(12) United States Patent
Thompson et al.

(10) Patent No.: US 6,950,969 B2
(45) Date of Patent: Sep. 27, 2005

(54) CASCADABLE DUAL FAN CONTROLLER

(75) Inventors: Clarence Rick Thompson, Houston, TX (US); Melvin Benedict, Houston, TX (US); Michael C. Sanders, deceased, late of Spring, TX (US); by Vivian McDaniels-Sanders, legal representative, Spring, TX (US); Jeffrey S. Autor, Houston, TX (US); John S. Lacombe, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 511 days.

(21) Appl. No.: 10/034,218

(22) Filed: Dec. 28, 2001

(65) Prior Publication Data

US 2003/0121642 A1 Jul. 3, 2003

(51) Int. Cl.[7] .............................................. G06F 11/00
(52) U.S. Cl. ....................................................... 714/44
(58) Field of Search ............................... 714/44, 14, 22

(56) References Cited

U.S. PATENT DOCUMENTS

| | | | | |
|---|---|---|---|---|
| 4,336,463 A | * | 6/1982 | Beeghly | 307/66 |
| 6,188,189 B1 | | 2/2001 | Blake | 318/471 |
| 6,255,973 B1 | | 7/2001 | Smith et al. | 341/141 |
| 6,318,965 B1 | * | 11/2001 | Nair | 417/2 |
| 6,398,505 B1 | * | 6/2002 | Sekiguchi | 417/2 |
| 6,725,132 B2 | * | 4/2004 | Frankel et al. | 700/300 |
| 2002/0010881 A1 | * | 1/2002 | White | 714/44 |
| 2003/0236594 A1 | | 12/2003 | Frankel et al. | |
| 2004/0130868 A1 | * | 7/2004 | Schwartz et al. | 361/687 |

* cited by examiner

*Primary Examiner*—Robert Beausoliel
*Assistant Examiner*—Aaron D Matthew

(57) ABSTRACT

A fan controller is described herein that can be connected to other fan controllers to provide fault information from one controller to the other(s). The fan controllers each control one or more fans. The controllers include signal(s) connected between the controllers that transmit fault information from one fan controller to the other(s) without the involvement of the host processor. Further, the controllers are capable of performing a "free wheeling" test in which idle fans are spun and tested.

21 Claims, 1 Drawing Sheet

CASCADABLE DUAL FAN CONTROLLER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a fan controller for an electronic system (e.g., a computer). More particularly, the invention relates to cascadable fan controllers in which a fault with one controller can be provided to the other controller without involvement of external controlling logic such as the system's host controller.

2. Background of the Invention

Many types of electronic equipment, such as computers, include one or more fans to move air through the equipment to thereby help cool the device. Some computers that use a large amount of power require a commensurate number of fans. It is not uncommon for some multiprocessor computers, for example, to include six or eight fans in one enclosure.

Each fan typically is driven by logic called a "fan controller." Fan controller logic may be implemented as discrete logic on the main system board or as a separate integrated circuit on the system board. Early on, each fan controller was able to control only one fan. Thus, multiple fan controllers were included in a system in which multiple fans were needed. In these configurations, it was up to the host processor to control the operation of the various fans by communicating independently with each fan controller. For example, in a system which included two fans with one fan spinning and the other fan included for redundancy, if the operational fan failed and such failure was detected by the host processor, the host processor would have to direct the redundant fan through its controller to begin operation.

Although generally satisfactory, it may not always be possible for the host processor to control the operation of one fan controller based on a fault condition of another fan. The host processor, for example, may be non-functional. If the host processor is non-functional and the primary fan is not spinning or not spinning sufficiently, there will not be a way to activate the backup fan. In general, it is not always satisfactory to rely on the host processor for controlling the operation of the fan controllers in a system. A better methodology is needed.

BRIEF SUMMARY OF THE INVENTION

The problems noted above are solved in large part by having multiple, cascadable fan controllers in an electronic system, such as a computer. The fan controllers each control one or more fans. Further, the controllers include signals connected between the controllers that transmit fault information from one fan controller to the other(s) without the involvement of the host processor. Further, the controllers of the preferred embodiment are capable of performing a "free wheeling" test in which idle fans are spun and tested. These and other advantages will become apparent upon reviewing the following disclosures.

BRIEF DESCRIPTION OF THE DRAWINGS

For a detailed description of the preferred embodiments of the invention, reference will now be made to the accompanying drawings in which.

NOTATION AND NOMENCLATURE

Figure 1:
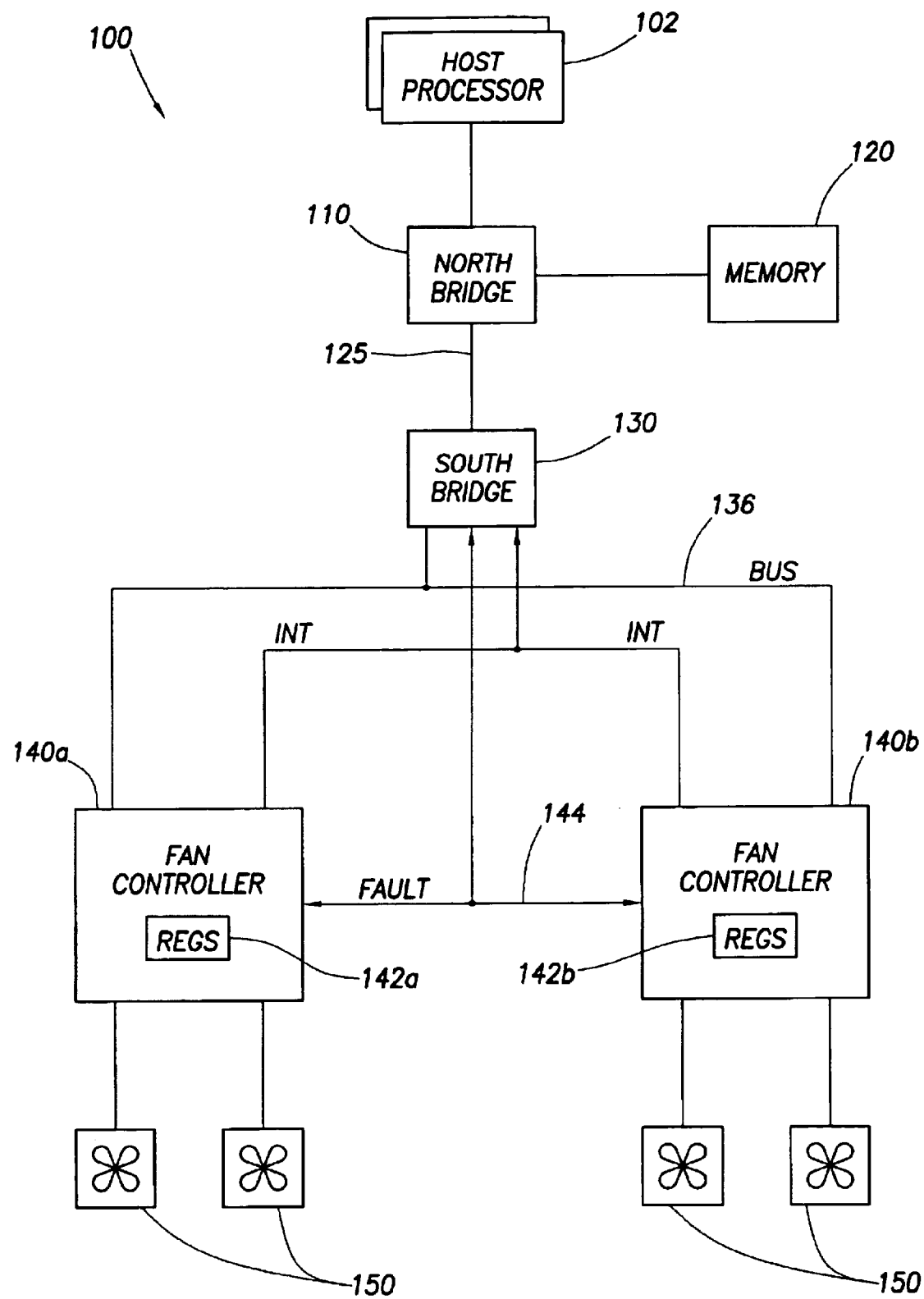
FIG. 1 shows a computer system embodying the preferred embodiment of the invention in which multiple fan controllers are present and interconnected so as to provide a hardware-based fault response.

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. In addition, no distinction is made between a "processor," "microprocessor," "microcontroller," or "central processing unit" ("CPU") for purposes of this disclosure. To the extent that any term is not specially defined in this specification, the intent is that the term is to be given its plain and ordinary meaning.

DETAILED DESCRIPTION OF THE PREFERRED EMBODIMENTS

Referring now to FIG. 1, system 100 is shown constructed in accordance with a preferred embodiment of the invention. As shown, system 100 includes one or more host processors 102, a north bridge 110, main memory 120, a south bridge 130, and one or more fan controllers 140a and 140b each coupled to one or more fans 150. The north bridge couples to the processors 102, memory 120 and the south bridge 130. The bus 125, which may be a peripheral component interconnect bus, interconnecting the north and south bridges 110, 130 may have one or more devices such as modems, network interface cards ("NICs"), and the like attached thereto. Other architectures besides that shown in FIG. 1 are possible also; the architecture in FIG. 1 is merely exemplary of one suitable embodiment.

The system shown in FIG. 1 includes two fan controllers 140a, 140b, but more than two controllers can be included or only a single controller if desired. The fan controllers are shown coupled to the south bridge 130, but alternatively can be coupled to other logic within the system 100, such as the north bridge 110 or host processor 102 or a baseboard controller (not shown). Further, each controller 140 is shown coupled to two fans 150, but additional fans can be coupled to each controller if desired or only a single fan. Each fan 150 receives power from the system's power supply (not shown) and control signals from the fan controllers 140. The control signals are generally provided via bus 136 from the south bridge 130 to the controllers 140. Bus 136 can be any suitable type of bus such as an I²C bus. The fan controllers 140 are capable of causing their fan(s) to operate at more than one speed which is programmable by the host processor 102.

In accordance with the preferred embodiment of the invention, the fan controllers 140a and 140b are connected together so as to provide a hardware-based fault response. That is, on a broad level, an error condition experienced by one fan controller or its fan(s) is transmitted to the other fan controller without the involvement of external controlling logic such as the host processor. This feature can be implemented in a variety of ways. For example, in FIG. 1, each fan controller connects to a FAULT signal 144 which is used to communicate faults between controllers. The FAULT signal preferably is a bi-directional signal meaning that each fan controller 140a, 140b can assert the signal or receive it from another fan controller which asserted it. When a controller 140 detects a fault with one of its own fans, that controller asserts the FAULT signal. The other fan controller in the system detects the assertion of the FAULT signal and responds in a predetermined or programmed manner. For example, a controller receiving a FAULT signal asserted by another controller may respond by causing one or all of its fans to spin in a high speed mode. This permits the failure of a fan or fans connected to one fan controller to be detected by another fan controller which can respond by running its fan(s) at a faster speed to make up for the loss of airflow caused by the failed fans. This process advantageously does not require processor involvement. The FAULT signal also can be provided to the south bridge 130 or an interrupt routing device (not shown) so that the host processor 102 can also be alerted of the existence of a fault.

Preferably, the FAULT signal remains asserted even after the error condition subsides. The FAULT signal remains asserted until cleared by software executing on the host processor 102. The FAULT signal 136 may also be provided to the south bridge 130 as shown so that the host processor can be made aware of the existence of a fault condition. Also, each fan controller includes an interrupt output signal which preferably are wire-OR'd and provided to the south bridge 130 as shown. Alternatively, the interrupts can be individually connected to the south bridge 130 or other logic. The interrupt signal can be asserted by a controller upon any one or more of various predetermined or programmed conditions such as a fan that is hot plugged (insertion or removal) or a fault.

The fan controllers 140 preferably have one or more registers 142a and 142b that are used for programming and status purposes. The registers 142a, 142b include a plurality of bits some of which provide status information, and others of which can be used to control various aspects of the fan controller. Those bits that are useful for providing the inter-controller fault detection and control include:

FAULT status: This preferably is a Read only bit or bits that indicates whether that controller generated the FAULT signal or that controller simply detected the assertion of the FAULT signal by another device such as another controller. This bit can be read by the host processor 102 to determine the source of a fault condition.

High Speed Control: Read/write bit that, when set, causes the controller to operate its fans in a high speed mode and causes the controller to assert the FAULT signal. Can be set by the host processor or external sensor (e.g., temperature sensor).

Interrupt and FAULT mask: Read/write bit or bits that precludes the controller from asserting its FAULT signal or its interrupt signal.

Referring still to FIG. 1, the fan controllers 140a, 140b preferably include the ability to be tested during system initialization and during run-time. The fans 150 may be included in a mechanically serial configuration within the computer system 100 in which one fan is actively being operated and another fan is not being actively spun. In this configuration, the active fan may blow air through or suck air from the other inactive fan. If the inactive fan is broken in some way, it may not be apparent. The controller can be used to test for a faulty fan. The signals between a fan controller and its fan(s) preferably includes a tachometer signal from which the fan controller can detect whether the associated fan is spinning and how fast it is spinning. The registers 142a, 142b preferably include a bit that, when set, causes the controller to turn off one of its fans and spin up the other fan while monitoring its speed via the associated tachometer signal. Then, the controller can reverse the test to test the other fan. The fan controller determines whether each fan is functioning correctly by determining whether the fan is spinning at the target speed and/or whether the fans are otherwise reporting any errors with their operation.

As described herein, the preferred embodiment of the fan controllers permit the controllers to be cascaded together in such a fashion so as to permit faults to be detected and responded to without involvement of the host processor. It should be understood that each fan controller may contain a register which contains a value of the fan speed when fault information from another fan controller is received. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:

a host processor;

a plurality of fan controllers coupled to said host processor; and a fan coupled to each fan controller;

wherein the fan controllers are inter-connected by a fault signal which, when asserted, is used to transmit fault information between the fan controllers without host processor involvement and which remains asserted even when a fault associated with said fault information subsides;

wherein each fan controller comprises a register that includes a bit that can be set by said host processor to cause said fan controller to not assert said fault signal upon detection of a fault; and wherein at least one of the fan controllers can cause a fan to spin while not causing another fan to spin to thereby test the fan caused to be spun.

2. The computer system of claim 1 wherein a fan controller receives said fault information from another fan controller and responds by changing the speed of its fan.

3. The computer system of claim 2 wherein said fan controller increases the speed of its fan.

4. The computer system of claim 1 further including a bridge disposed between said host processor and said fan controllers, said bridge also coupled to said fault signal.

5. The computer system of claim 1 wherein said register can be accessed by said host processor to determine which fan controller asserted said fault signal.

6. The computer system of claim 1 wherein said fault signal remains asserted until cleared by said host processor.

7. The computer system of claim 1 wherein said at least one fan controller causes said fan that was caused to be spun to cease spinning and causes another fan to be spun to thereby test said other fan.

8. The computer system of claim 1 wherein a fan controller asserts said fault signal upon detection of a fault with respect to its fan.

9. The computer system of claim 1 wherein a fan controller contains a register which contains a value of the fan speed when said fault information from another fan controller is received.

10. A fan controller, comprising:

an interface to controlling logic;

an interface to at least first and second serially arranged fans which permits said fan controller to control the speed of said fans;

a programmable register accessible by a host processor via said controlling logic; and an input/output fault signal adapted to be coupled to another fan controller through which, when said I/O fault signal is asserted, fault information can be shared between fan controllers without host processor involvement and wherein said I/O fault signal remains asserted even when a fault associated with the fault information subsides;

wherein said register includes a bit that can be set by said host processor to cause said fan controller to not assert said input/output fault signal upon detection of a fault; and wherein said register includes a second bit that can be programmed to cause the first fan to spin while precluding the second fan from spinning to thereby test the first fan.

11. The fan controller of claim 10 wherein said fan controller can receive said fault information from another fan controller and responds by changing the speed of one or more of its fans.

12. The fan controller of claim 11 wherein said fan controller increases the speed of one or more of its fans.

13. The fan controller of claim 10 wherein said controlling logic comprises a bridge disposed between said host processor and said fan controller, and said fault signal adapted to be provided to said bridge.

14. The fan controller of claim 10 wherein said register can be used by said host processor to determine whether the fan controller asserted said fault signal.

15. The fan controller of claim 10 wherein said I/O fault signal remains assorted until cleared by a host processor external to said fan controller.

16. The fan controller of claim 10 wherein said fan controller causes said first fan to cease spinning and causes said second fan to spin to thereby test said second fan.

17. The fan controller of claim 10 wherein said fan controller asserts said fault signal upon detection of a fault with respect to one or more of its fans.

18. The fan controller of claim 10 further including a register which contains a value of fan speed when said fault information from another fan controller is received.

19. A method of controlling fans in a computer system having multiple fan controllers and a host processor, comprising:

detecting a fault with respect to a fan;

transmitting fault information from one fan controller to another via a fault signal without using said host processor and only if a register is written with a value that permits said fault information to be transmitted and continuing to transmit said fault information even when a fault associated with said fault information subsides, otherwise, not transmitting said fault information;

responding to an asserted fault signal if said fault information is transmitted; and testing said fan by causing said fan to spin while precluding a second fan from spinning and then testing said second fan by causing said second fan to spin while precluding the previously spinning fan from spinning.

20. The method of claim 19 wherein transmitting the fault information includes asserting a fault signal interconnecting at least one pair of said fan controllers.

21. The method of claim 19 wherein responding to said asserted fault signal includes increasing fan speed.

* * * * *